United States Patent Office 2,721,798
Patented Oct. 25, 1955

2,721,798
COMPOUNDS CONTAINING AN ISOPHTHALATE GROUP USEFUL IN PHOTOGRAPHY

Anthony Loria and Edward T. Pesch, Rochester, N. Y., assignors to Eastman Kodak Company, Rochester, N. Y., a corporation of New Jersey No Drawing. Application September 2, 1953, Serial No. 378,158

11 Claims. (Cl. 95—6)

This invention relates to new compounds containing an isophthalate group and a method for preparing such compounds.

The new compounds of our invention can be represented by the following general formula:

I.

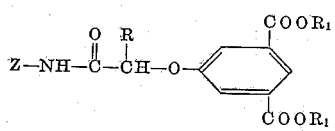

wherein R represents a hydrogen atom or an alkyl group, such as methyl, ethyl, etc., $R_1$ represents a hydrogen atom, a methyl group, or an alkali metal atom, such as sodium, potassium, etc., and Z represents an aromatic nucleus (e. g. benzene, naphthylene, etc.), said nucleus being substituted by a radical selected from the group consisting of a pyrazolone radical, i. e. a radical of the formula:

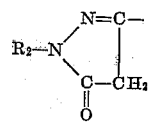

wherein $R_2$ represents an alkyl group, such as methyl, ethyl, n-propyl, etc., or an aromatic radical, such as phenyl, chlorinated phenyl, brominated phenyl, naphthyl, etc.; a phenolic radical, such as hydroxyphenyl, hydroxynaphthyl and substituted derivatives thereof; or the radical of an open chain ketomethylene compound. The portion of the molecule represented by the above general formula wherein Z is defined is well known in the art of color photography. The portion of the molecule represented by Z is that portion of the compound of Formula I which condenses with the oxidation products formed during development. Such principles are well understood by those skilled in the art of photography and our invention is to be interpreted in the light of this particular prior art. However, we have found the compounds represented by the following general formula, which compounds are embraced by Formula I above, are particularly useful for the purposes of our invention:

II.

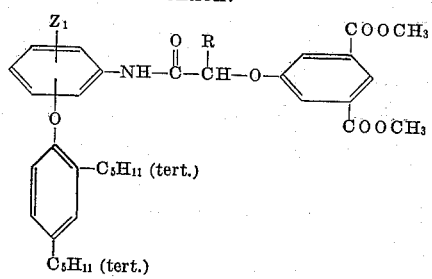

wherein R has the values given above and $Z_1$ represents a carbanilyl radical having substituted thereon a pyrazolone radical as defined above under Z, a phenolic radical, or a radical containing an open chain ketomethylene group.

Accordingly, it is an object of our invention to provide new compounds containing an isophthalate group. Another object is to provide a method for making such compounds. Still another object is to provide new intermediates which are useful in preparing couplers useful in color photography. Another object is to provide a method for making such intermediates. Another object is to provide photographic emulsions containing the new compounds of our invention. Other objects will become apparent from a consideration of the following description and examples.

The compounds represented by Formula II above are particularly useful in preparing solutions for incorporation in photographic emulsions inasmuch as the ester groups of the isophthalate radical are easily hydrolyzed in alkaline solution (e. g. aqueous sodium hydroxide, aqueous potassium hydroxide, etc.) to produce the alkali metal salts which are quite soluble in the solutions to be added to the photographic emulsion. Also, in the event it is desired to incorporate the new compounds of our invention in photographic developing solutions, the compounds of Formula II are easily incorporated in such developing solutions by simply adding the compound to an aqueous alkaline solution as described above. Acidification of these alkaline solutions produces the free carboxylic acids, i. e. compounds of Formula I wherein $R_1$ is a hydrogen atom.

The compounds of Formula II can advantageously be prepared by condensing a compound having the following formula:

III.

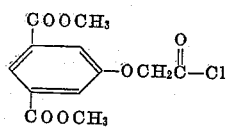

with a aminic coupling component having the following formula:

IV.           Z—NH$_2$ wherein Z has the values given above. These condensations are advantageously carried out in the presence of an acid-binding agent, such as alkali metal acetates, pyridine, etc., although the use of such an acid-binding agent is not necessary. The condensations are advantageously carried out in the presence of an inert solvent, such as anhydrous acetic acid, acetonitrile, diethyl ether, etc. Temperatures varying from room temperature to the reflux temperature of the reaction mixture can be employed, although we have found that it is quite convenient to simply heat the reaction mixture on the steam bath for a short period of time.

The aminic coupling components represented by Formula IV above have been previously described in the art of color photography, and as noted above, our invention is to be construed in the light of the prior art. For example, a very large number of such aminic coupling components have been previously described and it is not believed essential to enumerate this large body of material herein, inasmuch as this particular embodiment of the invention has been described in detail in a large number of U. S. patents. Typical aminic coupling components have been described in one or more of the following patents:

| Name | U. S. Patent | Date of Issue |
|---|---|---|
| Salminen et al | 2,423,730 | July 8, 1947. |
| Weissberger et al | 2,511,231 | June 13, 1950. |
| Do | 2,589,004 | Mar. 11, 1952. |
| Loria et al | 2,600,788 | June 17, 1952. |
| Weissberger et al | 2,618,641 | Nov. 18, 1952. |

The following schematic diagram will illustrate more fully the manner whereby the new compounds represented by the above general Formulas I and II can be prepared according to our invention.

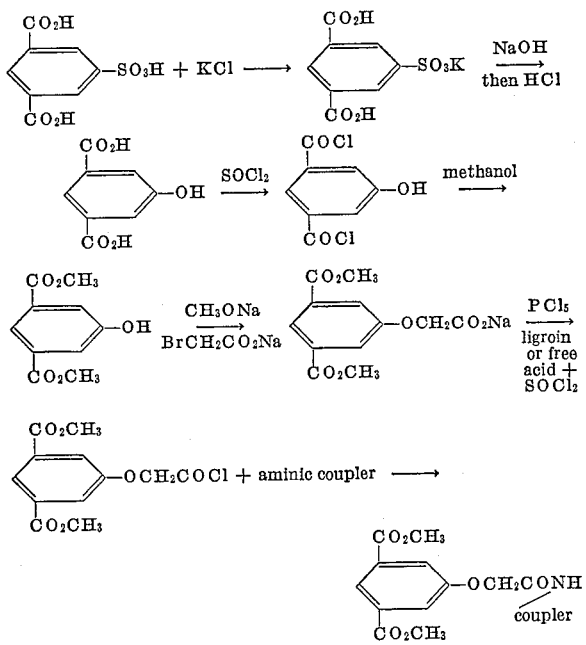

The following examples will serve to illustrate more fully the manner whereby we practice our invention.

*Example 1.—3,5-dichloroformylphenol*

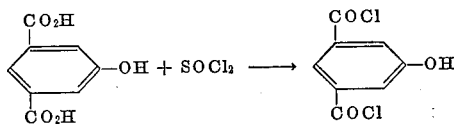

In a 1-liter, 3-necked standard-taper flask was mixed 156 grams (.855 mol) of 3,5-dicarboxyphenol and 800 ml. of distilled thionyl chloride. (The 3,5-dicarboxyphenol was prepared as given by Heine in B13, 497.) The flask was equipped with a mechanical stirrer and a water-cooled condenser. The mixture was heated at reflux with stirring until complete solution had taken place (about 36 hours). The excess thionyl chloride was distilled off, first under normal pressure and finally under reduced pressure on the steam bath. The product was used in the next step without purification. Yield 187 grams, 100 percent of theory.

*Example 2.—3,5-dicarbomethoxyphenol*

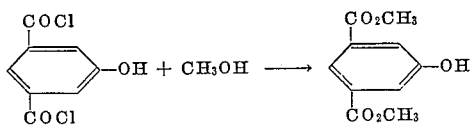

The crude acid chloride (187 grams, 0.855 mole), while still warm (to keep it liquid), was added to a thin stream to 1 liter of absolute methyl alcohol. The methyl alcohol had been previously cooled to about 10° C. and was stirred vigorously during the addition of the acid chloride. The reaction mixture became hot, and a brisk evolution of hydrochloric acid gas took place. The reaction mixture was then cooled to 10° C. and the precipitate formed was filtered by suction and dried in a hot oven.

The product was crystallized from 2 liters of dry xylene, thus getting a material melting at 163–5° C. in long white needles. Yield, 138 grams, which is 77 percent of the 179.5 grams theoretical quantity based on the acid used in making the acid chloride.

*Example 3.—3,5-dicarbomethoxyphenoxyacetic acid*

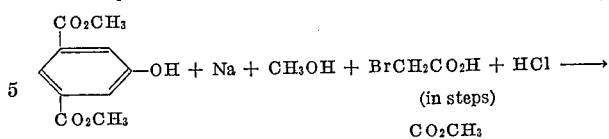

Absolute methyl alcohol, 300 ml., was reacted with 13.8 grams (0.6 mol) of clean sodium in a 1-liter, 3-necked flask equipped with a water-cooled condenser carrying a drying tube and a mechanical stirrer. The third neck was used for the addition of the other reagents. To the sodium methoxide formed was added first 63 grams (0.3 mol) of 3,5-dicarbomethoxyphenol followed by 41.7 grams (0.3 mol) of bromoacetic acid dissolved in 100 ml. of absolute methanol with mechanical stirring.

The reaction mixture was heated at reflux on a steam bath with stirring for 18 hours. The precipitate first formed reacted slowly during the heating giving rise to the formation of a much less flocculent new precipitate. After this time the mixture was cooled, poured into 1 liter of cold water, and acidified with dilute hydrochloric acid. The solid formed was filtered by suction, washed free of acid, and air-dried.

The dry material was crystallized from boiling dry xylene. The product was a white crystalline solid and had a M. P. of 164–165° C.

A mixed sample of starting material and product showed a depression of 25–30° C.

*Example 4.—α-[3,5-dicarbomethoxyphenyl]butyric acid*

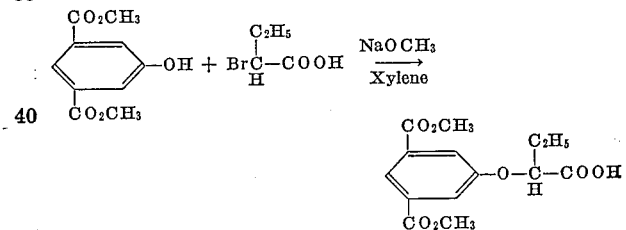

In 500-cc. three-necked flask fitted with a sealed stirrer and a condenser equipped with a calcium chloride drying tube was placed 100 cc. of absolute methanol and 4.6 grams (.2 mole) of clean sodium. Then 21 grams (0.1 mole) of 3,5-dicarbomethoxy phenol and a solution of 16.7 grams (.1 mole) of α-bromobutyric acid in 200 cc. dry xylene were added in sequence to the sodium methoxide solution. The condenser was inverted and the excess methanol distilled. The mixture from which a solid separated was refluxed 12 hours, cooled, then poured into 500 cc. of water. The xylene layer was separated and discarded. The aqueous layer, after being extracted with ether, was acidified with dilute (6N) HCl. The clear oil which first separated solidified on chilling in an ice bath. The solid was filtered, recrystallized twice from 50% H₂O-methanol yielding 16.7 grams of white material, 149–152° C. (56%).

*Example 5.—α - (3,5 - dicarbomethoxyphenoxy)acetyl chloride*

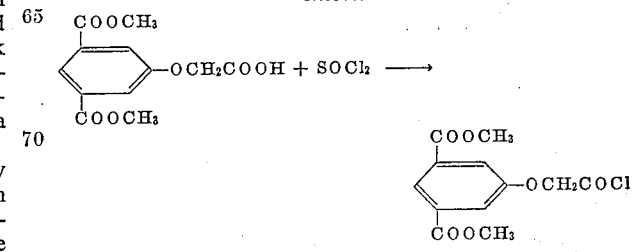

A suspension of 26.8 g. (0.1 mole) of α-(3,5-dicarbomethoxyphenoxy)acetic acid in 200 ml. of thionyl chloride was stirred under a reflux condenser at 40–45° until complete solution had taken place. The reaction time was about 14 hours. The excess thionyl chloride was removed under reduced pressure without raising the temperature above 40°. The residue solidified in the flask. It was broken up and used in the next operation without purification. Yield 28.6 g.—100% of theory.

*Example 6.—1 - hydroxy - N - {β - {2 - [2,4 - di - tert - amylphenoxy] - 5 - [α - (3,5-dicarbomethoxyphenoxy)-acetamido]benzamido}ethyl} - 2 - naphthamide*

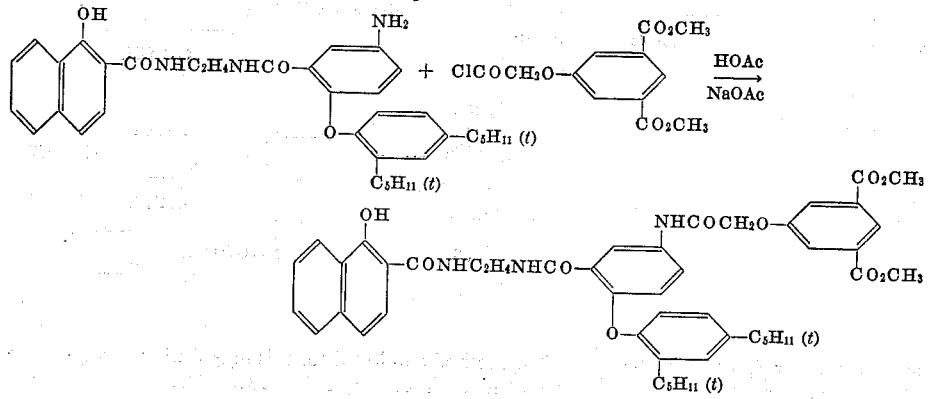

A mixture of 5.8 g. (.01 mole) of 1-hydroxy-N-{β-[2 - (2,4 - di - tert - amylphenoxy) - 5 - aminobenzamido]ethyl} - 2 - naphthamide and 2.86 g. (.01 mole) of α-(3,5-dicarbomethoxyphenoxy)acetyl chloride were mixed in 150 ml. of anhydrous acetic acid in a 500-ml. flask and heated on a steam bath for about 10 minutes with occasional shaking. One gram of anhydrous sodium acetate was then added and the heating continued for 1.5 hours, the reaction mixture being protected from moisture with a drying tube during the whole operation. Addition of water to the mixture caused the formation of a solid which was filtered, washed well with cold water, and dried. The dry solid was crystallized twice from methyl alcohol, thus obtaining a white crystalline material melting between 149–151° C., and giving the following analytical results:

|   | Found | Calculated for $C_{47}H_{51}N_3O_9$ |
|---|---|---|
|   | Percent | Percent |
| C | 69.8 | 70.0 |
| H | 6.5 | 6.4 |
| N | 5.1 | 5.2 |

The naphthamide used in the above example was prepared as follows:

Thirty g. (0.5 mole) of ethylenediamine and 26.4 g. (0.1 mole) phenyl-1-hydroxy-2-naphthoate were mixed while cooling in an ice bath. Without cooling the temperature rises above 100° C. With cooling the temperature was kept at 45–50° and after the vigorous reaction subsided, the excess ethylenediamine was removed under reduced pressure. The residue was crystallized from butyl alcohol; M. P. 156–8° C.

The 1-hydroxy-2-β-aminoethylnaphthamide was then condensed with 2-(2',4'-diamylphenoxy)-5-nitrobenzoyl chloride and the nitro group of the product reduced to the amine as indicated in Example 6 of Weissberger and Edens, U. S. Patent 2,589,004.

*Example 7.—1 - phenyl - 3 - {3 - {2 - [2,4 - di - tert - amylphenoxy] - 5 - [α - 3,5 - dicarbomethoxyphenoxy)-acetamido]benzamido}benzamido} - 5 - pyrazolone*

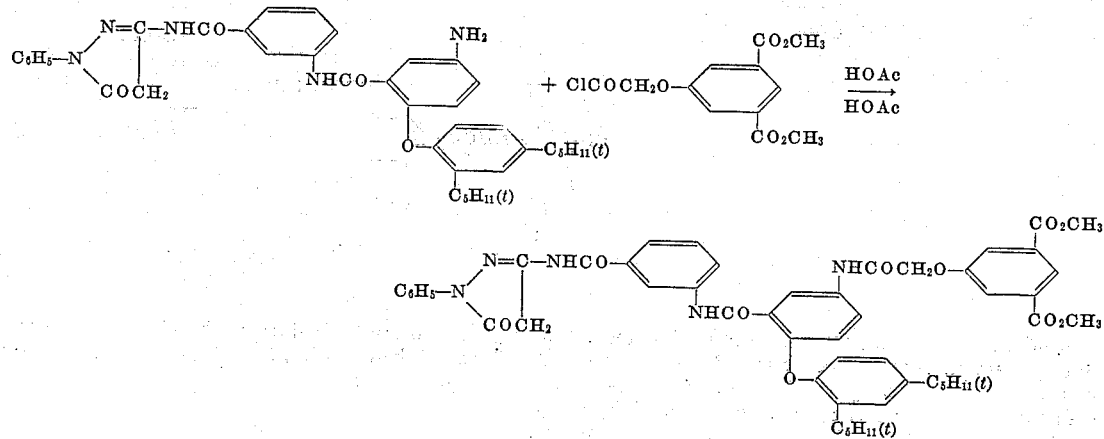

The method employed for this preparation was the same as that given in Example 6 above, except that the use of potassium acetate as the condensing agent was found to give better results than sodium acetate. The dry crude solid obtained by adding cold water to the reaction mixture was crystallized, once from acetonitrile, and twice from a 50–50 mixture of acetonitrile and n-propyl alcohol. The product obtained had a M. P. of 149–150° C. and gave the following analytical figures:

|   | Found | Calculated for $C_{51}H_{53}N_5O_{10}$ |
|---|---|---|
|   | Percent | Percent |
| C | 68.6 | 68.3 |
| H | 6.0 | 5.9 |
| N | 8.0 | 7.7 |

The pyrazolone component employed in the above example was prepared as described in the copending application Serial No. 260,099, filed December 5, 1951, in the names of I. Salminen and A. Weissberger.

*Example 8.—6-{2-[2,4-di-tert-amylphenoxy]-5-[α-(3,5-di-carbomethoxyphenoxy) - butyramido]benzamido} - 2,4-dichloro-3-methylphenol*

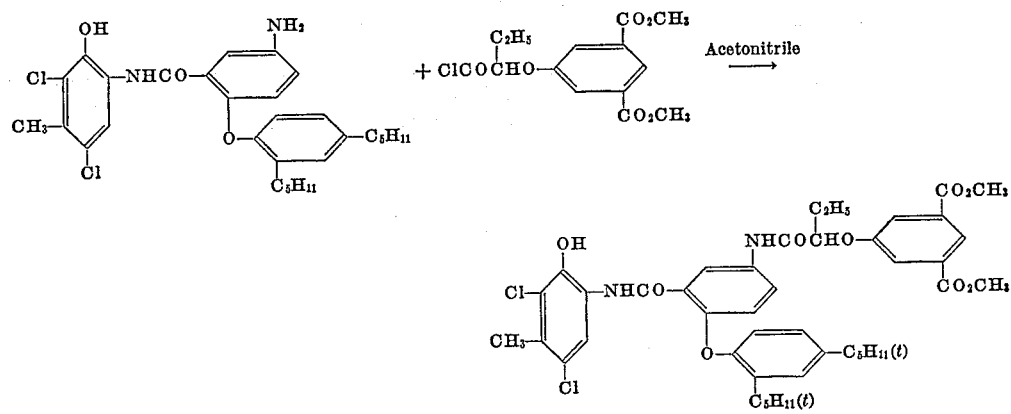

A mixture of 2.52 g. (.005 mole) of 6-[5-amino-2-(2,4-di-tert - amlphenoxy)benzamido] - 2,4 - dichloro - 3-methylphenol and 1.57 g. (.005 mole) of α-(3,5-dicarbomethoxyphenoxy)butyryl chloride in 50 ml. of dry acetonitrile was refluxed for 30 min. and let stand for one hr. The reaction mixture was poured into 300 ml. of cold water and stirred mechanically until the oil that had separated solidified. The solid was filtered, washed well with cold water and dried. The dry material was crystallized twice from acetonitrile, using carbon black once. The product had a M. P. of 194–6° C. and gave the following analysis:

|   | Found | Calculated for $C_{44}H_{50}Cl_2N_2O_9$ |
|---|---|---|
|   | Percent | Percent |
| C | 64.1 | 64.5 |
| H | 5.9 | 6.1 |
| Cl | 8.6 | 8.6 |
| N | 3.5 | 3.4 |

The phenol component employed in the above example was prepared by condensing 4-amino-2,6-dichloro-m-cresol (C. A. vol. 35, pg. 3249) with 2-(2',4'-di-t-amylphenoxy)-5-nitrobenzoyl chloride, followed by reduction of the nitro group as described in U. S. Patent 2,589,004.

*Example 9.—6-{4-[2,4-di-tert-amylphenoxy]-3-[α-(3,5-di-carbomethoxyphenoxy) - acetamido]benzamido} - 2,4-dichloro-3-methylphenol*

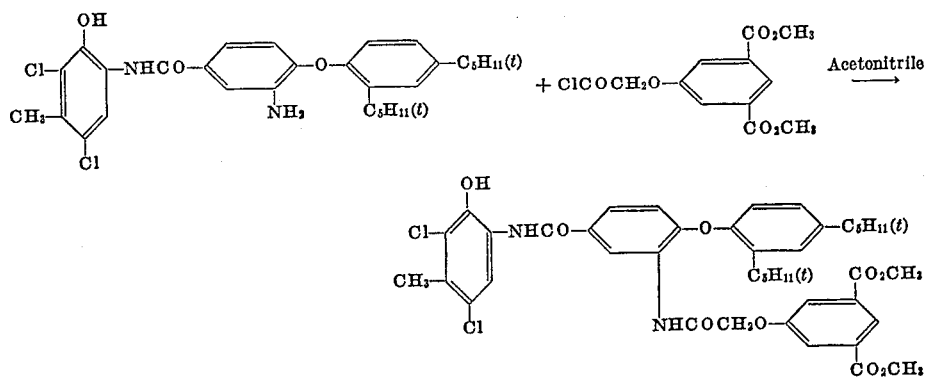

The method employed for this preparation was the same as that given in Example 8 above. The dry crude product was crystallized from n-butyl alcohol. The pure compound had a M. P. of 208–210° C. and analyzed as given below:

|   | Found | Calculated for $C_{42}H_{46}Cl_2N_2O_9$ |
|---|---|---|
|   | Percent | Percent |
| C | 63.3 | 63.5 |
| H | 5.7 | 5.8 |
| Cl | 8.7 | 8.5 |
| N | 3.7 | 3.5 |

The aromatic amine component employed in the above example was prepared by condensing 4-amino-2,6-dichloro-m-cresol with 4-(2',4'-di-t-amylphenoxy)-3-nitrobenzoyl chloride, followed by reduction of the nitro group as described in U. S. Patent 2,589,004.

*Example 10.*—α-{4-[α-(3,5-dicarbomethoxyphenoxy)acetamido]benzoyl}-2-(2,4-di-tert-amylphenoxy)acetanilide

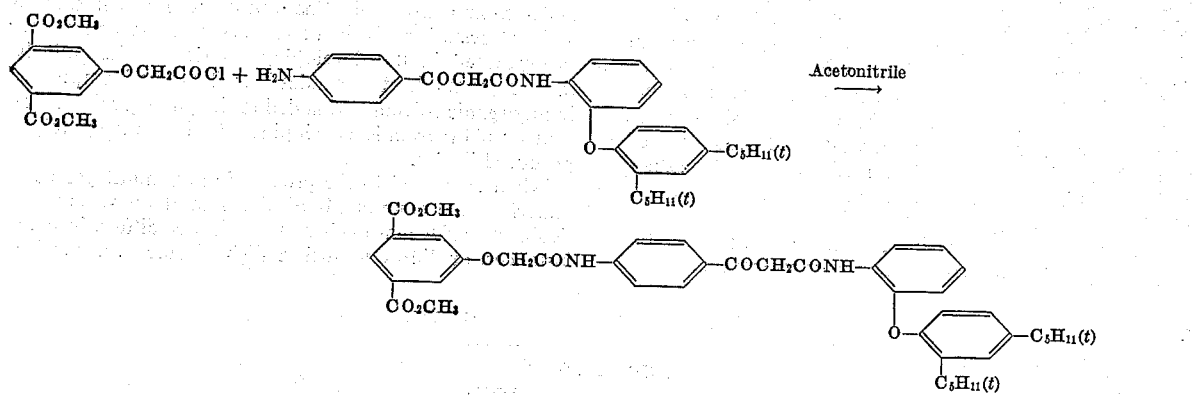

A mixture of 2.43 g. (.005 mole) of α-(4-aminobenzoyl)-2-(2,4-di-tert-amylphenoxy)acetanilide and 1.43 g. (.005 mole) of α-(3,5-dicarbomethoxyphenoxy)acetyl chloride in 50 ml. of dry acetonitrile was heated at 60° C. for 10 min. and let stand for one hr. At the end of this time, complete crystallization had taken place. The solid was filtered, washed with cold acetonitrile and crystallized twice from the same solvent, using carbon black once.

The product melted at 287–9° C. and gave the following analytical results:

|   | Found | Calculated for $C_{43}H_{48}N_2O_9$ |
|---|---|---|
|   | *Percent* | *Percent* |
| C | 69.8 | 70.0 |
| H | 6.4 | 6.5 |
| N | 3.8 | 3.8 |

The amine component employed in the above example was prepared as follows: Sodium 2,4-di-5-amylphenate was reacted with o-chloronitrobenzene to give o-(2,4-di-5-amylphenoxy)nitrobenzene (B. P. 183–6° C./1 mm.). This latter compound was then reduced with Raney nickel to produce the corresponding amino compound (M. P. 198–200° C.). This amino compound was then condensed with ethyl p-nitrobenzoylacetate to give 2-(2,4-di-5-amylphenoxy)-α-(4′-nitrobenzoyl)acetanilide (M. P. 159–161° C.). This nitro compound was then reduced to the desired amino compound (M. P. 157–8° C.) with Raney nickel.

*Example 11.*—1-(2,4,6-trichlorophenyl)-3-{3-[α-(3,5-dicarbomethoxyphenoxy) - n - butyramido]benzamido}-5-pyrazolone

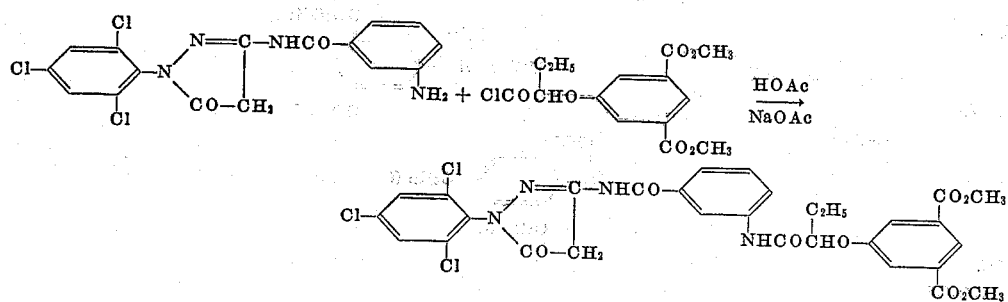

This coupler was prepared by the method employed in Example 6 above. The crude product was crystallized from acetonitrile from which it came out in colorless plates having a melting point of 187–9° C.

The aromatic amine component used in the above example has been previously described in U. S. Patent 2,618,641.

*Example 12.*—6-{α-{4-[α-(2,5-dicarbomethoxyphenoxy)-n - butyramido]phenoxy}acetamido} - 2,4 - dichloro-3-methylphenol

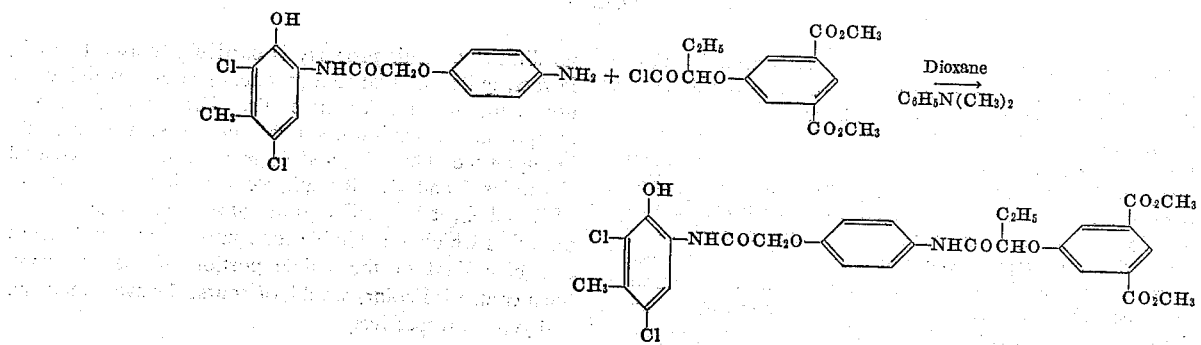

A solution of 4.1 g. (.012 mole) of 6-[α-(4-aminophenoxy)acetamido]-2,4-dichloro-3-methylphenol in 25 ml. of dry dioxane was mixed with 3.75 g. (.012) of α-dicarbomethoxyphenoxy)-n-butyryl chloride and the mixture heated on the steam bath for 5 min. Dimethylaniline (1.4 g.) was then added to the mixture and heating continued for 1.5 hrs. longer. The reaction mixture was diluted with an equal volume of water and cooled to 10° C. for 2 hrs. The precipitate formed was filtered, washed, and crystallized twice from ethyl alcohol. There was obtained a slightly pink solid melting at 185–7° C.

In a manner similar to that illustrated in the above examples, the following compounds were prepared:

I.
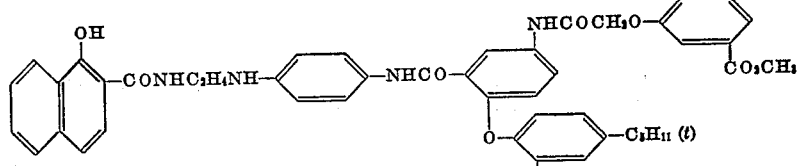

II.
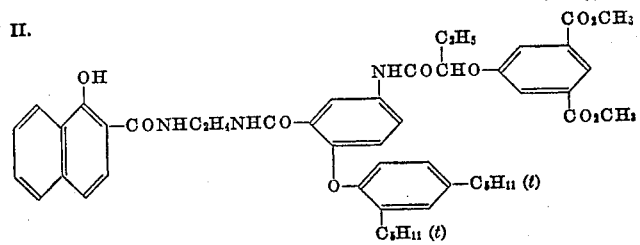

III.
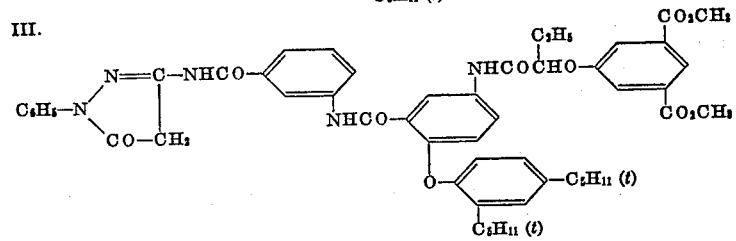

IV.
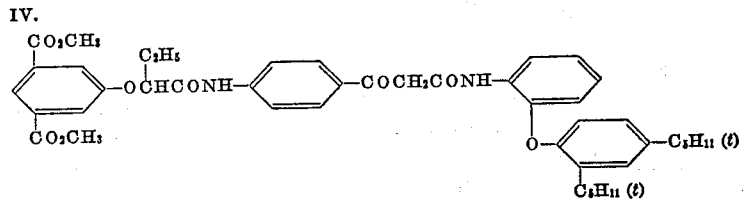

V.
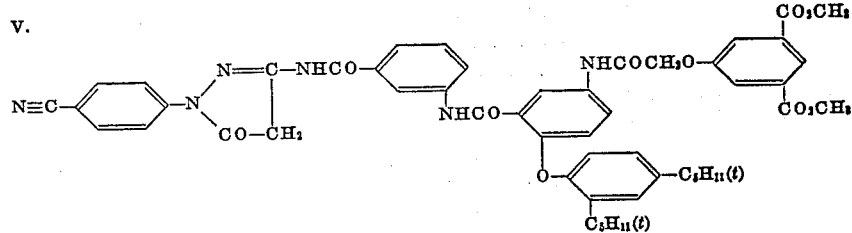

In like manner, other compounds embraced by Formulas I and II can be prepared according to the description given in Examples I to XII above.

The compounds of Formula II and those of Formula I wherein $R_1$ represents a methyl group can advantageously be incorporated in photographic emulsions by dispersing the compound in an aqueous alkaline medium as mentioned above, whereupon spontaneous hydrolysis of the ester groups occurs to produce the soluble alkali metal salts. Upon development, these alkali metal salts couple with the oxidation products of the developer to produce the desired color image. These principles are well understood in the art of photography. Instead of incorporating these compounds directly in the emulsion, they can be added to an aqueous alkaline solution to induce hydrolysis and the resulting alkali metal salts of these compounds incorporated in the developing solution. Alternatively, these compounds of Formulas I or II can be incorporated in an organic solvent and added to the photographic emulsion or photographic developing solution and hydrolysis produced in situ.

When employed in the preparation of multilayer color materials, the compounds of Formula II above are particularly useful inasmuch as they do not diffuse in many instances, or diffuse to such a slight degree as to produce no difficulty. This property is particularly useful and is, in fact, quite essential to a practical process involving the use of multilayer color materials. The color of the new compounds of our invention will, of course, vary depending upon the value of Z and $Z_1$ given in the above general Formulas I and II. By suitable variation in the values of Z and $Z_1$, it is possible to produce a variety of colored materials which are suitable for controlling the red, green and blue light of the visible portion of the spectrum. Such controlled colors would, of course, be cyan, magenta and yellow, respectively.

What we claim as our invention and desire secured by Letters Patent of the United States is:

1. A photographic silver halide emulsion containing a compound selected from those having the following general formula:

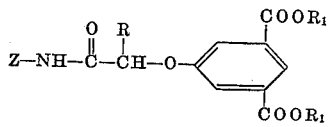

wherein R represents a member selected from the group consisting of a hydrogen atom and an alkyl group, $R_1$ represents a member selected from the group consisting of a hydrogen atom, a methyl group, and an alkali metal atom, and Z represents a mononuclear aromatic radical having substituted thereon a pyrazolone radical containing a radical represented by the following general formula:

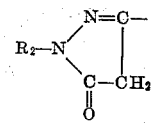

wherein $R_2$ represents a member selected from the group consisting of an alkyl group and an aromatic group.

2. A photographic silver halide emulsion containing a compound selected from those represented by the following general formula:

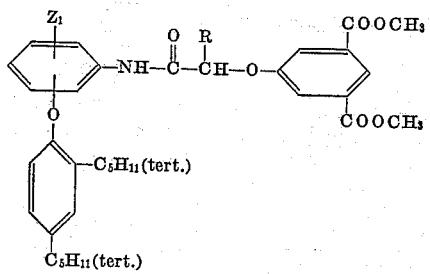

wherein R represents a member selected from the group consisting of a hydrogen atom, a methyl group, and an ethyl group, and $Z_1$ represents an aromatic radical substituted by a radical containing a pyrazolone radical selected from those represented by the following general formula:

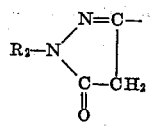

wherein $R_2$ represents a member selected from the group consisting of an alkyl group and an aromatic group; a phenolic radical and a radical containing an open chain ketomethylene group.

3. A photographic silver halide emulsion containing a compound selected from those represented by the following general formula:

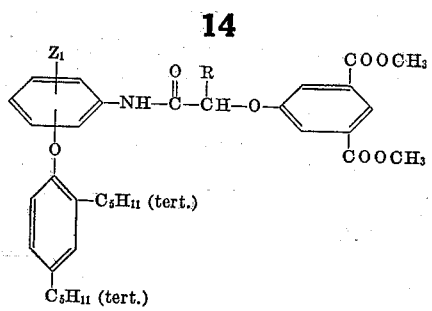

wherein R represents a member selected from the group consisting of a hydrogen atom and an alkyl group, and $Z_1$ represents an aromatic radical containing a radical represented by the following general formula:

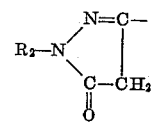

wherein $R_2$ represents a member selected from the group consisting of an alkyl group and an aromatic group.

4. A photographic silver halide emulsion containing a compound selected from those represented by the following general formula:

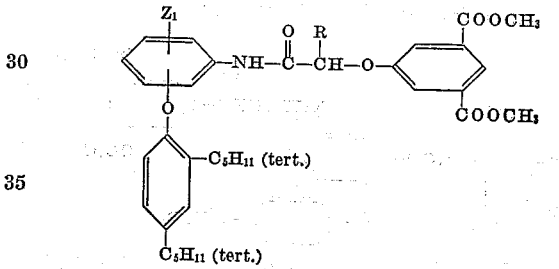

wherein R represents a member selected from the group consisting of a hydrogen atom and an alkyl group and $Z_1$ represents an aromatic radical containing a phenolic radical.

5. A photographic silver halide emulsion containing a compound selected from those represented by the following general formula:

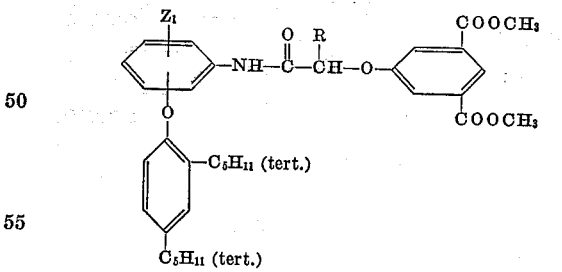

wherein R represents a member selected from the group consisting of a hydrogen atom and an alkyl group and $Z_1$ represents an aromatic radical containing an open chain ketomethylene radical.

6. A photographic silver halide emulsion containing the compound having the following formula:

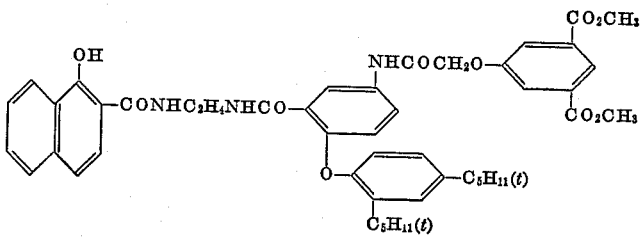

7. A photographic silver halide emulsion containing the compound having the following formula:

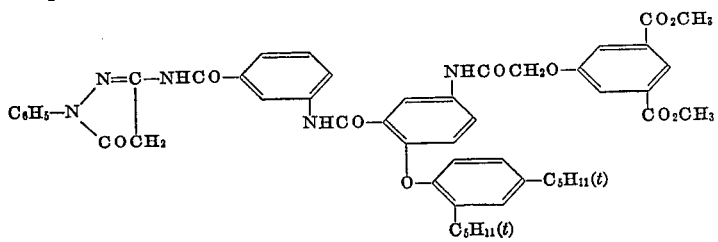

8. A photographic silver halide emulsion containing the compound having the following formula:

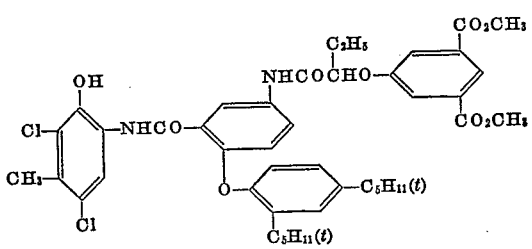

9. A photographic silver halide emulsion containing the compound having the following formula:

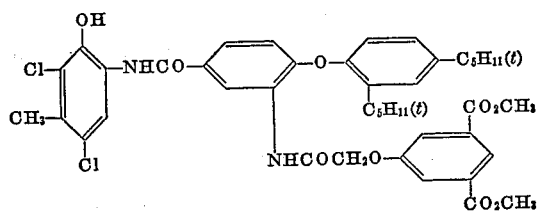

10. A photographic silver halide emulsion containing the compound having the following formula:

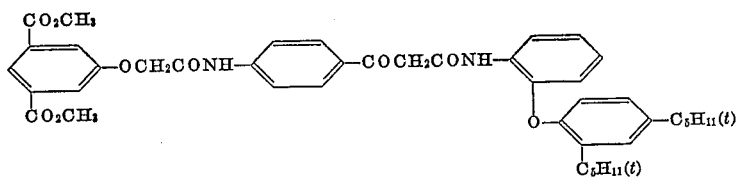

11. A photographic silver halide emulsion containing a compound selected from those represented by the following general formula:

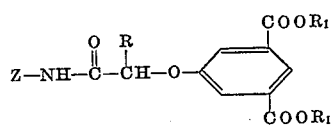

wherein R represents a member selected from the group consisting of a hydrogen atom or an alkyl group, $R_1$ represents a member selected from the group consisting of a hydrogen atom, a methyl group, and an alkali metal atom, and Z represents an aromatic radical having substituted thereon a member selected from the group consisting of a pyrazolone radical, a phenolic radical, and a radical containing an open chain ketomethylene group.

References Cited in the file of this patent
UNITED STATES PATENTS

| | | |
|---|---|---|
| 2,540,401 | Merckx | Feb. 6, 1951 |
| 2,569,906 | Starke | Oct. 2, 1951 |
| 2,570,038 | Smith et al. | Oct. 2, 1951 |
| 2,617,820 | Gamrath et al. | Nov. 11, 1952 |